(12) United States Patent
Bowe et al.

(10) Patent No.: US 8,151,538 B2
(45) Date of Patent: Apr. 10, 2012

(54) WEATHER RESISTIVE BARRIER FOR BUILDINGS

(75) Inventors: Michael Damian Bowe, Doylestown, PA (US); Iain Crerar, Medfield, MA (US); Janah Cecelia Szewczyk, Philadelphia, PA (US)

(73) Assignee: Rohm and Haas Company, Philadelphia, PA (US)

( * ) Notice: Subject to any disclaimer, the term of this patent is extended or adjusted under 35 U.S.C. 154(b) by 729 days.

(21) Appl. No.: 12/288,829

(22) Filed: Oct. 23, 2008

(65) Prior Publication Data

US 2009/0107611 A1 Apr. 30, 2009

Related U.S. Application Data

(60) Provisional application No. 61/000,486, filed on Oct. 26, 2007.

(51) Int. Cl.
*E04B 2/00* (2006.01)

(52) U.S. Cl. .......... 52/745.05; 52/309.4; 52/741.3; 52/741.4; 427/408; 427/409

(58) Field of Classification Search .......... 52/309.4, 52/741.3, 741.4, 742.1, 742.13, 745.05; 427/407, 427/408, 409; 106/33
See application file for complete search history.

(56) References Cited

U.S. PATENT DOCUMENTS

| | | | |
|---|---|---|---|
| 3,607,341 A | 9/1971 | Goins et al. | |
| 4,230,746 A | 10/1980 | Nahta | |
| 4,350,774 A | 9/1982 | Scotti et al. | |
| 4,381,066 A | 4/1983 | Page et al. | |
| 4,882,888 A | 11/1989 | Moore | |
| 5,130,191 A | 7/1992 | Pole | |
| 5,492,655 A | 2/1996 | Morton et al. | |
| 5,804,627 A | 9/1998 | Landy et al. | |
| 5,979,131 A | 11/1999 | Remmele et al. | |
| 6,011,076 A | 1/2000 | Tabakovic | |
| 6,025,404 A | 2/2000 | Harris et al. | |
| 6,194,479 B1 | 2/2001 | Tabakovic | |
| 6,284,077 B1 | 9/2001 | Lucas et al. | |
| 6,333,365 B1 | 12/2001 | Lucas et al. | |
| 6,340,715 B1 | 1/2002 | Sommer | |
| 6,355,333 B1 | 3/2002 | Waggoner et al. | |
| 6,376,574 B1 * | 4/2002 | Helmer et al. | 523/172 |
| 6,395,794 B2 | 5/2002 | Lucas et al. | |
| 6,403,703 B1 | 6/2002 | Slone | |
| 6,414,044 B2 | 7/2002 | Taylor | |
| 6,868,643 B1 | 3/2005 | Williams | |
| 6,901,712 B2 | 6/2005 | Lionel | |
| 6,931,809 B1 | 8/2005 | Brown et al. | |
| 7,029,609 B2 | 4/2006 | Sommer | |
| 7,155,868 B2 | 1/2007 | Cole et al. | |
| 7,159,368 B2 | 1/2007 | Peng | |
| 7,179,845 B2 | 2/2007 | Taylor | |
| 7,662,221 B2 * | 2/2010 | Fay | 106/15.05 |
| 2005/0005567 A1 | 1/2005 | Meister et al. | |
| 2005/0229524 A1 | 10/2005 | Bennett et al. | |

FOREIGN PATENT DOCUMENTS

| | | |
|---|---|---|
| CN | 1314870 C | 5/2007 |
| DE | 37 28 397 A1 | 3/1989 |

* cited by examiner

*Primary Examiner* — Mark Kopec
*Assistant Examiner* — Haidung Nguyen
(74) *Attorney, Agent, or Firm* — Andrew I. C. Merriam

(57) ABSTRACT

We form a weather-resistive barrier on a building by applying a flexible and compressible latex foam comprising one or more polymer having a glass transition temperature of less than 25° C. on the gaps between adjacent sheets of construction sheathing and coating the sheets and the foam with an aqueous coating composition. The aqueous coating composition is flexible and can comprise the same one or more polymer as the polymer in the foam.

10 Claims, No Drawings

WEATHER RESISTIVE BARRIER FOR BUILDINGS

This application claims the benefit of priority under 35 U.S.C. §119(e) of U.S. Provisional Patent Application No. 61/000,486 filed on Oct. 26, 2007.

This invention relates to a method for making a weather-resistive barrier for buildings.

Many buildings are constructed with exterior wood, cement or gypsum-based sheets that are overlaid with decorative facades or claddings (e.g., wood, aluminum or vinyl sidings). When such a building is under construction, in many cases, a flexible sheeting material (e.g., Tyvek from DuPont, felt or tar paper) is nailed or stapled to the construction sheathing before the cladding is mounted. Such sheeting material provides some protection while the building is under construction, as well as after the cladding is mounted. Such protection includes a resistance against wind and liquid water penetration.

Such flexible sheeting, however, is labor intensive to apply because the sheeting material must be unrolled and stretched over the area to be covered by hand, then nailed or stapled into place. And it is not a very good wind or water barrier. As the sheeting material involves placing sheets side by side with some overlap of the sheets, adjacent sheets are not typically sealed together, allowing for wind to enter between the overlaps. Water can also enter the overlaps, and even can enter behind the flexible sheeting through nail or staple holes.

Some have suggested using liquid coatings on the wood, cement or gypsum sheathing, and using tapes on the joints between adjacent sheets in order to bridge the gaps between adjacent sheets. Such tapes often require a separate coating that must be applied with a trowel or scraper that dries to form a hard sealant over the tape. This taping and coating process is quite labor intensive.

Latex foams have been used as sealants and caulks around windows in houses under construction. Typically, such foams are dispensed from cans and expand upon application. Also, foams are designed to fit in tight slots and not over joints with open space on one side. As such, these foams tend not to adhere well to wood or gypsum sheathing, leaving joints unevenly covered. When such foams dry, however, they are difficult to compress such that they are typically not used to seal joints between sheathing sheets since the expanded foam does not compress when cladding is applied, causing cladding to buckle or ripple outwardly from the building.

This invention is a method of making a weather-resistive barrier on a building under construction that employs adjacent sheets of wood, cement or gypsum exterior sheathing on a structural frame with gaps between the sheets, comprising:

(a) applying a foamed aqueous emulsion polymer composition to the gaps wherein the composition comprises one or more aqueous emulsion polymer with a Tg less than 25° C., a surfactant, water and a blowing agent wherein a wet, freshly applied 12 mm thick and 50 mm wide bead of the foamed composition has the ability when dried to be compressed to a thickness of not more than 3 mm under a stress of no more than 0.035 MPa; and (b) applying an aqueous polymeric coating composition over the sheathing and the foamed composition wherein the polymeric coating has a density when dried of greater than 0.7 g/ml.

Foamed composition (a) and coating composition (b) can comprise the same one or more polymer, i.e. the same polymer or polymer mixture.

The method of this invention further comprises installing a decorative cladding over the coated sheathing.

The foamed composition is flexible, such that after drying at least one day, a foam strip formed on a mesh backing can be wrapped around a cylindrical metal mandrel with a diameter of 100 mm without cracking. For cold weather applications, a suitable foamed composition (a) can, after drying at least one day, be formed into a foam strip comprising a mesh backing and wrapped around cylindrical metal mandrel with a diameter of 50 mm without cracking.

Preferably, the foamed composition (a) has the ability when dried to be compressed to a thickness of not more than 3 mm under a stress of no more than 0.0035 MPa. In one embodiment, the foamed composition (a) has the ability to self-compress to not more than 3 mm under no externally applied stress.

Preferably, at least one of the compositions (a) or (b) comprises a polyfunctional amine or a polyethyleneimine to facilitate skinning of the compositions so as to resist rain while the composition(s) is drying, or to allow further coatings to be more quickly applied over those compositions.

Preferably, the one or more polymer in foamed composition (a) consists essentially of an aqueous emulsion polymer with a Tg less than 25° C. Accordingly, the preferred foamed composition (a) does not comprise any polymer having a Tg more than 25° C.

In particular, for either the foam component (a) or the coating component (b) or both, it may be desired to cause faster setting or skinning than would otherwise occur by drying. This may be advantageous in preventing a recently applied but incompletely dried weather resistive barrier from being washed off by a sudden rainstorm. This also may make for faster installation with coating (b) applied minutes after foam (a) installation. Accelerated setting or skinning can be achieved by including in the formulation a polyfunctional amine as disclosed in U.S. Pat. No. 5,804,627 (Rohm and Haas) or a polyethyleneimine as disclosed U.S. Pat. No. 6,376,574 (Dow).

The coating composition (b) should be selected so as to allow for an appropriate water vapor transmission for the building. Depending on the climate, the capacity of a building's heating, ventilation and air conditioning (HVAC) system, the material of construction of the entire building and other factors known to building scientists, the coating component (b) should be chosen to give a finished weather resistive barrier with an appropriate water vapor transmission rate to reduce any moisture condensation in the walls of the building. This vapor transmission rate is most often measured according to ASTM E-96 and expressed in units of perms, where higher perms correlate with a greater rate of water vapor transmission. OSB, a common sheathing material, has approx 3-6 perms. For a home, in which interior moisture from cooking and bathing is generated, a weather resistive barrier (b) with >10 perms may be desired, so that any moisture which reaches the OSB is not unduly inhibited from diffusing through the barrier (b) to the exterior.

By contrast, commercial buildings usually have higher capacity HVACs, that can remove sufficient moisture from the interior so that water does not condense in the walls. Thus, a low perm weather resistive barrier may be preferred. One skilled in the art of coating formulation can make coatings with a desired perm value, measuring candidate coating compositions (b) according to ASTM E-96. Furthermore, commercially available coatings are sometimes provided with a perm data, which can aid in the selection of a coating properly matched to the building science teachings.

Some suitable composition for the coating component (b) include:
- Rhoplex™ EC-2540 (a flexible, acrylic polymer emulsion) without any further additives.
- A blend of 90 parts Rhoplex™ EC-2540/10 parts Ropaque™ Ultra E (a non film forming polymer which provides coating opacity).
- Sto Gold Coat (a yellow coating based on styrene-acrylic copolymer, with 5.7 Perms) from Sto Corp of Atlanta, Ga.
- Henry Airbloc 33 (a black coating based on acrylic copolymer, with 11.6 Perms) from Henry Inc. of Huntington Park, Calif.
- Henry Airbloc 06WB (a black coating based on asphalt emulsion, with 0.02 Perms) from Henry Inc. of Huntington Park, Calif.

A suitable composition (b) is given in Example 16 below.

Coating composition (b) can be applied by spray equipment, brush or roller.

Aqueous polymers and copolymers suitable for both the foam aqueous component (a) and for the coating component (b) used in this invention can be acrylic class or vinyl acetate-acrylic class of polymers, as shown in the examples. Other classes of polymers are also suitable, such as styrene-acrylics (e.g. Rhoplex™ 2019R from Rohm and Haas or Acronal S-400 from BASF); ethylene-vinyl acetates, styrene-butadienes, and polyurethane dispersions, examples of which are described in U.S. Pat. No. 7,179,845 (Fomo Products Inc.). Useful acrylic emulsion polymers include Rhoplex™ EC-2540, Rhoplex™ EC-1791 QS, Rhoplex™ MC-1834, Rhoplex™ AC-630. Rovace™ 9100 is an acrylic-vinyl acetate copolymer. The Rhoplex and Rovance polymers are available from Rohm and Haas Co. of Philadelphia, Pa.

"Glass transition temperature" or "Tg" means the midpoint glass transition temperature of a polymer as determined by differential scanning calorimetry (DSC"), in accordance with ASTM E-1356-91 where samples are run on a TA Instruments Q-1000 DSC at a ramp rate of between 10° to 20° C./min., in a nitrogen atmosphere, from −90° C. to 150° C. (twice). The midpoint inflection was taken from the second heating. When we say that a polymer has a Tg of greater than a stated value, we mean that the midpoint of the single inflection point in the DSC curve is above that value. Should the DSC curve have multiple inflection points, then the midpoint of at least one of the inflection points is above that value.

As explained above, the foam component (a) contains a surfactant. Many surfactants and combinations thereof can be suitable for generation and stabilization of aqueous foams (a) used in this invention. Among these are nonionic surfactants, anionic surfactants and cationic surfactants. Suitable nonionic surfactants include those based on ethoxylated octylphenol (TRITON™ X series), ethoxylated nonylphenol (TERGITOL™ NP series), ethoxylated secondary alkyl alcohols (TERGITOL™ TMN and 15-S series), all available from Dow Chemical, and linear alcohol ethoxylates in the Brij series from ICI Americas. The one or more surfactant can be used in amounts of from 0.1 to 50 wt. %, based on the weight of polymer and surfactant, preferably, up to 10 wt. %.

Suitable anionic surfactants include anionic sulfates, sulfonates, phosphates or phosphonates such as sodium lauryl sulfate (e.g. Stanfax-234 from Para-Chem), sodium salts of sulfated fatty alcohol ethoxylates (e.g. Disponil FES-32 from Cognis Corp.), sodium dodecylbenzene sulfonate (e.g. Rhodacal DS-4 from Rhodia Corp.), sodium dioctyl sulfosuccinate (e.g. Aerosol OT-70 from Cytec Industries), ammonium salt of alkyl ethoxylate phosphate (e.g. Rhodacal RS-610 from Rhodia Corp.) and anionic carboxylate salts such as ammonium stearate and potassium oleate (e.g. Stanfax-320 and Stanfax-1 respectively, from Para-Chem). Preferred anionic surfactants are salts of stearic acid, particularly ammonium and potassium salts.

Suitable cationic surfactants include those disclosed in U.S. Pat. No. 7,179,845 (Fomo Products Inc.) and in U.S. Pat. No. 5,696,174 (Allied Foam Tech Corp).

Preferably, the one or more surfactant is a liquid at use temperature and pressure. However, up to 5 wt. % of a waxy surfactant, such as a stearic acid salt, can be used without adversely affecting the flexibility and compressibility of the foam.

Suitable blowing agents to make the foam component (a) include air, carbon dioxide, nitrogen, low boiling hydrocarbons (e.g., propane, butane, isobutane) and low boiling halocarbons, and lower alkyl ethers (e.g., dimethyl ether). Air or carbon dioxide are preferred.

Optional ingredients in both the (a) and (b) compositions include biocides, rheology modifiers, extenders (fillers), opacifying pigments (mineral and organic (e.g. opaque polymer)), fly ash, dispersants, defoamers, UV stabilizers, colorants, fire retardants, pH adjusters or buffers, coalescents, cosolvents, glass fibers, carbon fibers, microbeads and antifreeze agents.

While the examples below employ either a simple batch mixer or an aerosol can to make foam, the foam can be made and applied to buildings using various known methods and equipment, for example, the continuous foamer model no. 2M*172 from E.T. Oakes Corp., Hauppauge, N.Y. Other foam generator/applicator equipment include static mixers, as disclosed in U.S. Pat. No. 5,492,655 (Schuller International Inc.), U.S. Pat. No. 4,986,667 (3M), and U.S. Pat. No. 6,422,734 (National Gypsum LLC). Still other foam generators include venturi or air eductors to draw and mix air into a fluid stream, such as disclosed in U.S. Pat. No. 6,010,083 (BetzDearborn Inc.), U.S. Pat. Nos. 6,042,089, and 6,561,438 (Fountainhead Group).

The aqueous foam component (a) can also be dispensed from a pressurized aerosol container, as disclosed in U.S. Pat. No. 7,029,609 (Rathor) and references contained therein.

In addition to the materials described above, other materials used in the Examples below are as follows. Foamaster NXZ (defoamer) is available from Cognis Corp. Snowhite 12 (calcium carbonate) is supplied by Omya Inc. Colortrend "F" 888-1045 (colorant) is supplied Degussa Corp. Tamol™ 850 (dispersant) is available from Rohm and Haas Co. Acrysol™ TT-615 (rheology modifier) is available from Rohm and Haas Co. Imsil A-150 is ground silica from Unimin Specialty Minerals Inc. of Elco, Ill.

"Comparative example, DAP" is DAP Tex Plus available from DAP Inc. of Baltimore, Md. It is a water-borne foam delivered from an aerosol can, propelled with a mixture of propane, butane and methyl ether. As determined by differential scanning calorimetry (DSC), the multiple Tgs of the DAP Comparative example include a Tg of about 100° C. corresponding to a hard polymer. Further, the Dap Comparative example showed a melting point of from 50 to 60° C., as determined by DSC, corresponding to a waxy solid surfactant.

EXAMPLES 1-8

Foam Generation and Evaluation

To 80 g of polymer emulsion Rhoplex™ EC-2540 (Tg -10° C.), surfactants were added with gentle mixing. This liquid mixture was placed in the 5 L mixing bowl of a Hobart bakery mixer, then whipped on high speed (#3) with the wire whisk attachment for 5 minutes. Density of the resultant foams was measured by scooping foam into a 135 mL paper cup and striking level, then weighing.

To ascertain whether a foam has the ability when dried to be compressed to a thickness of less than 2 mm under a stress of no more than 0.035 MPa, the following test is employed. Foams prepared as above were troweled in a band 50 mm wide and 12 mm thick (2×0.5 inches) onto a flat board. After drying 24 hours, the thickness of the band was measured, and entered into Table 1 as "H24h."

A stiff aluminum plate 75 mm long×25 mm wide×3.3 mm thick was laid across the dried foam band, to span the width of the band completely and have a contact area between the plate and foam of 25 mm×50 mm (1×2 inches). Weights were placed onto the plate to give a total weight of 225 g, (approx 0.5 lb) creating a pressure of about 0.0035 MPa, and the height of the foam under the plate was measured after 1 minute, and entered into Table 1 as "H225 g." If this value was >2 mm, weight was increased to 2.2 kg (approx 5 lbs) creating a pressure of about 0.035 MPa, the height was measured after 1 minute and entered in Table 1 as "H2.2 kg."

TABLE 1

Height of foam bands, after drying and compression with weights.

| Example | Stanfax-320 | 2$^{nd}$ Surfactant | g/mL | H24 h | H225 g | H2.2 kg | Observations |
|---|---|---|---|---|---|---|---|
| 1 | 4.0 g | 0 | 0.09 | 5 mm | 2 mm | | Fine, white foam. |
| 2 | 0 | 4.0 g Triton X-405 | 0.11 | 6 | 1.5 | | Some foam cells visible by eye. |
| 3 | 0 | 3.0 g Tergitol NP-10 | 0.09 | 4 | 1.3 | | Like #2 |
| 4 | 0 | 4.0 g Stanfax-234 | 0.05 | <2 | <1.0 | | faster to foam vs. 1, partial collapse. |
| 5 | 2.0 | 1.6 g Stanfax-234 | 0.07 | 3 | 1.2 | | |
| 6 | 1.0 | 0.8 g Stanfax-234 | 0.08 | 4 | 1.5 | | |
| 7 | 0.4 | 0.8 g Stanfax-234 | 0.09 | 3 | 1.0 | | |
| 8 | 0.4 | 1.6 g Stanfax-234 | 0.06 | 2 | 0.9 | | White, textured |
| DAP* | | comparative example | 0.12 | 22 | 16 | 5 mm | Expanded in first 24 h. When 2.2 kg removed, rebounds to 9 mm. |

EXAMPLES 9-12

Alternative Latexes

Foams were generated from other latexes in the same manner as examples 1-8. Their characteristics are reported in Table 2.

TABLE 2

Foams from alternative emulsion polymers. All used 80 g of emulsion, 0.8 g of Stanfax-234 and 0.8 g of Stanfax-320

| Ex | Emulsion | Tg | g/mL | H24 h | H225 g | H2.2 kg | Observations |
|---|---|---|---|---|---|---|---|
| 9 | Rhoplex ™ EC-1791 QS | −40° C. | 0.15 | 5 mm | 1.8 mm | | Flexible skin on top. |
| 10 | Rhoplex ™ MC-1834 | +8° C. | 0.07 | 7 | 4 | 1.1 mm | |
| 11 | Rhoplex ™ AC-630 | +25° C. | 0.05 | 9 | 6 | 1.8 | Least flexible. |
| 12 | Rovace ™ 9100 | +18° C. | 0.05 | 1 | <1.0 | | |

EXAMPLE 13

Foam with Lower Fraction of Polymer and a Lot of Surfactant

A mixture of 50 g of Rhoplex™ EC-2540, 10 g of water, 40 g of Stanfax-234 and 10 g of Stanfax-320 was whipped to a foam as in examples 1-8.

EXAMPLE 14

Foam and Coating Made with Same Coating Composition

As explained above, we can make a foam composition (a) from the same basic coating composition that is used for coating (b). The advantage of this approach is that one can simply add suitable materials to composition (b) to create a foam (a). In this fashion, one can then make a coating (b) that can be also be used to make a foam (a) with the addition of a few additional ingredients. For example, a coating (b) comprising a mixture of 50 g (wet) of Rhoplex EC-2540, 10 g of water and 50 g of Imsil-150 was blended at low speed for 30 seconds for coating component (b). To make foam (a) from this coating (b), a combination of 1 g of Stanfax-234 and 10 g of Stanfax-320 was added, and the mixture was whipped to a foam with air as in examples 1-8.

TABLE 3

Characteristics of foams from Examples 13 and 14.

| Ex. | Description | g/mL | H24 h | H225 g | H2.2 kg |
|---|---|---|---|---|---|
| 13 | High surfactant concentration | 0.13 | 1.6 mm | 1.6 mm | |

TABLE 3-continued

Characteristics of foams from Examples 13 and 14.

| Ex. | Description | g/mL | H24 h | H225 g | H2.2 kg |
|---|---|---|---|---|---|
| 14 | Inorganic extender in foam | 0.13 | 10 | 6 | 1.8 mm |

EXAMPLE 15

Foam Properties

15a. Flexibility: The foam from example 6, and the comparative DAP foam were cast 6 mm thick in 200×200 mm sheets over a glass fiber mesh on release paper. After drying at least one day, foam strips with mesh were wrapped around cylindrical metal mandrels of various diameters: 100, 50, 25 and 6 mm. Foam of example 6 did not crack on any mandrel; DAP foam cracked on the all the mandrels.

15b. Tensile Strength and Elongation: The foam from example 6, and the comparative DAP foam were cast 6 mm thick in 200×200 mm sheets on release paper, without any mesh. Samples were cured for 4 days. Using a template, dog bone samples were cut, width of neck region 0.25 in (6.35 mm) width of grasp points 0.75 in (19.05 mm). Samples were tested in tension until fracture, at a position rate of 2.0 in/min (50.8 mm/min). Fracture is defined by formation of two independent pieces of material, that are in no way connected to one another. For Example 6, the maximum tensile strength of 0.045 MPa at 2750% elongation. For DAP, the maximum strength of 0.02 MPa occurred at 100% elongation.

| Tensile Strength & Elongation | Example 6 Foam | DAP Comp. |
|---|---|---|
| Yield Strength (MPa) | 0.01 | 0.015 |
| % Elongation @ Yield | 180 | 50 |
| Max Strength (MPa) | 0.045 | 0.02 |
| % Elongation @ Max Strength | 2750 | 400 |
| Break Strength (MPa) | 0.04 | 0.00 |
| % Elongation @ Break | 3000 | 175 |

15c. Creep resistance in compression: Sheets of foam were cast on release paper to an initial thickness of 12 mm (and 50 mm wide and 200 mm long), and dried at least one day. A stiff aluminum plate weighing 2.5 grams (40 mm×40 mm×0.66 mm thick) was placed on each sheet. Weights were applied on the aluminum plate to compress its thickness, and the decrease in thickness was measured over time. To experience a similar compressive creep as the comparative example, the inventive foam Example 6 required less than one tenth as much weight.

| | Foam Ex. 6 | Foam Ex. 6 | DAP | DAP |
|---|---|---|---|---|
| Initial Height t = $t_{o\ (MM)}$ | 10.58 | 8.44 | 12.94 | 12.8 |
| Weight applied (g) | 7 g | 20 g | 400 g | 800 g |
| % Compression over time | | | | |
| t = 30 min | 18% | 33% | 18% | 31% |
| 60 min | 24% | 29% | 25% | 38% |
| 90 min | 24% | 28% | 31% | 39% |
| 120 min | 29% | 28% | 32% | 40% |
| 45 h | 40% | 43% | 41% | 52% |

The significant of this compressibility is that decorative cladding can easily be applied over foams used in this invention without the cladding being distorted by not being able to compress the foam that might be protruding from the exterior sheathing joints.

EXAMPLE 16

A Liquid Building Coating

| Material | Part by Weight |
|---|---|
| Water | 9.5 |
| Propylene Glycol | 0.67 |
| Tamol ™ 850 | 0.26 |
| Triton x-405 | 3.4 |
| Foamaster NXZ | 0.15 |
| Rhoplex ™ EC 2540 | 37.14 |
| Begin Grind | |
| Snowhite 12 | 47.91 |
| Foamaster NXZ | 0.15 |
| Colortrend "F" 888-1045 | |
| Red Iron Oxide | 0.12 |
| Aqueous Ammonia (28%) | 0.17 |
| Acrysol ™ TT-615 | 0.53 |
| Total | 100 |

The above recipe was made on a 5000 g scale. During the initial weigh out, materials were added in order one at a time to a grind pot. Following each addition, the contents of the pot were briefly agitated by swirling. After the addition of Rhoplex™ EC-2540 the grind pot was transferred from the bench top and placed on the Cowles™ high speed disperser to mix and grind ingredients. Snowhite 12 was slowly added to ensure good dispersion. Agitator speed was initially set to 1000 rpm and was increased with addition of the Snowhite 12 to approximately 1300 rpm. Foamaster NXZ was added immediately following the Snowhite 12 addition, and the grind was held for 5 minutes for full incorporation. Following the addition of the Acrysol™ TT-615, the grind was held for 20 minutes. During this time the agitator speed was increased to between 2000-3000 rpm depending on conditions. Grind was filtered with 100 mesh and de-aired using a vacuum canister and agitator.

EXAMPLE 17

Impact Resistance of Coated Foam

Sheets of foam were prepared as in example 15b. After the foam dried for 2 days, the coating of example 16 was applied by brush in 2 coats over the foam with 2 hours of drying between coats then dried overnight, to a final coating thickness of approximately 15 dry mils (0.38 mm). After drying overnight, the coated foam was subjected to a falling dart impact tester, of 908 g (21b) weight and 12 mm (0.5 inch) spherical tip. The dart was dropped on a fresh area of coated foam resting on a hard flat board from progressively higher heights, until the coating was visibly torn. The coated foam of Example 6 passed to 430 mm (17 inches) and failed 480 mm (19 inches). Comparative example DAP failed at the lowest height, 12 mm (0.5 inches).

EXAMPLE 18

Preparation of Sheathing Test Joint

Two 150×75 mm rectangles of oriented strand board ("OSB") were clamped to a board such that the 150 mm sides were parallel but 6 mm apart, forming an open, 6 mm-wide gap between the adjacent rectangles. Such a gap simulates those found between sheets of exterior sheathing in residential and commercial building under construction.

A band of foam of example 6 was applied 50 mm wide and 12 mm thick when wet over and across the gap and dried overnight to form a foam bridge approx 3 mm thick. The coating of example 16 was then applied across the joint and over the OSB rectangles by brush in 2 coats with 2 hours of drying between coats then dried overnight, to a final coating thickness of approximately 15 dry mils (0.38 mm). The clamps were removed to free the rectangles from the supporting board to provide a test joint spanned by foam and entirely covered by the coating. Due to the foam in the joint, the center of the coated joint was only approximately 2 mm higher than the plane of the coated OSB outside the area which had received the band of foam. However, the foam could be flattened even further with gentle finger pressure. Multiple samples of these joints were used in the following water tightness test.

EXAMPLE 19

Water Tightness of the Joint

One open end of a 80 cm-long section of 7.5 cm diameter PVC pipe was placed over the a test joint of Example 18 such that the coated, foamed joint crossed the diameter of the pipe end. The open end of the pipe was sealed to the test joint with silicone sealant. After the silicone cured, the pipe was filled approx 2.5 cm deep with water, and the bottom of the joint was periodically checked for leaks. After 24 hours, no water could be detected beneath the joint.

The water was emptied and the assembly was dried 24 hours. It was then filled to a depth of 55 cm to provide a head pressure of water over the joint. At 5 hours, no leaks were detected.

EXAMPLE 20

Foam from Aerosol Can

A mixture of 95 g of Rhoplex™ EC-2540, 4 g of Stanfax-320 and 1 g of Stanfax-234 was placed into a an aluminum can (200 mL are available from McKernan Packaging Clearinghouse of Reno, Nev.) which was closed with a bottle closure (Body Orifice #062, Stem Orifice #018 and a Spout #S20L7, all available from Seaquist Perfect Dispensing of Cary, Ill.). The can was then charged with 2.0 g of propane and 4.0 g of n-butane. The can was shaken for 30 sec, inverted and the trigger depressed, to dispense a foam of similar properties as in example #1 above. Optionally, a flexible hose was affixed to the can spout before dispensing to allow the stream of foam to be directed into and over a joint between OSB boards. As a further option, a flattened funnel (opening 42 mm wide×4 mm thick) was affixed to the end of the flexible hose, allowing a band of foam to be applied over the gap in a rapid single pass.

EXAMPLES 21-22

Dimensional Stability of Aqueous Foam from an Aerosol Can

Aerosol cans as in Example 20 were filled with the following recipes, then were kept on a shelf for 3 months to monitor their storage stability.

|  | Ex 21 | Ex 22 |
|---|---|---|
| Rhoplex ™ EC-2540 | 100 g | — |
| Rhoplex ™ 1791 QS | — | 100 g |
| Stanfax-320 | 7.25 | 6.75 |
| Propane | 10 | 5.7 |
| Butane | 0 | 2.0 |

After storage, foams were discharged and troweled into a band 50 mm wide and 12 mm thick on a flat board and the thickness of the band was measured periodically for 24 hours, after which no further thickness changes were seen. All foams expanded in size for approximately 2 hours after the time of application. Overnight, the foams which are suitable as a component of the invention reduced to 25% of their as-applied thickness or less. The comparative DAP example continued to expand beyond the 2 hour mark, and its ultimate thickness was about double its as-applied thickness.

| Time after discharge | Ex. 21 | Ex. 22 | DAP Comp. |
|---|---|---|---|
| 30 min | 15.4 mm | 15.9 mm | 17.4 mm |
| 45 | 15.7 | 15.8 | 18.5 |
| 60 | 15.6 | 15.5 | 19.3 |
| 90 | 15.6 | 15.6 | 20.4 |
| 120 | 15.3 | 15.2 | 21.2 |
| 24 hours | 3.0 | 2.0 | 24.3 |

We claim:

1. A method of making a weather-resistive barrier on a building under construction that employs adjacent sheets of wood, cement or gypsum exterior sheathing on a structural frame with gaps between the sheets, comprising:
   (a) applying a foamed composition comprising one or more aqueous emulsion polymer to the gaps wherein the composition comprises an aqueous emulsion polymer with a Tg less than 25° C., a surfactant, water and a blowing agent wherein a wet, freshly applied 12 mm thick and 50 mm wide bead of the foamed composition has the ability when dried to be compressed to a thickness of not more than 3 mm under a stress of no more than 0.035 MPa; and
   (b) applying an aqueous polymeric coating over the sheathing and the foamed composition wherein the polymeric coating has a density when dried of greater than 0.7 g/ml.

2. The method as claimed in claim 1, wherein the one or more polymer in the foamed composition (a) consists essentially of an aqueous emulsion polymer with a Tg less than 25° C.

3. The method of claim 2 wherein the foamed composition has the ability when dried to be compressed to a thickness of not more than 3 mm under a stress of no more than 0.0035 MPa.

4. The method of claim 2 wherein the foamed composition has the ability to self-compress to not more than 3 mm under no externally applied stress.

5. The method of claim 2 further comprising installing a decorative cladding over the coated sheathing.

6. The method of claim 2 wherein at least one of the compositions (a) or (b) further comprises a polyfunctional amine or a polyethyleneimine.

7. The method as claimed in claim 1, wherein the foamed composition (a) and coating composition (b) comprise the same one or more polymer.

8. The method as claimed in claim 1, wherein the foamed composition (a) is flexible, such that after drying at least one day, a foam strip formed on a mesh backing can be wrapped around a cylindrical metal mandrel with a diameter of 100 mm without cracking.

9. The method of claim 8, wherein, after drying at least one day, the foamed composition (a) can be formed into a foam strip comprising a mesh backing and wrapped around cylindrical metal mandrel with a diameter of 50 mm without cracking.

10. The method as claimed in claim 1, wherein the surfactant is a liquid at use temperature.

* * * * *